Aug. 19, 1924.

W. D. ARCHER

HOOK

Filed June 15, 1923

1,505,235

W. D. Archer
INVENTOR

BY Victor J. Evans
ATTORNEY

WITNESS:

Patented Aug. 19, 1924.

1,505,235

UNITED STATES PATENT OFFICE.

WEST D. ARCHER, OF COCONUT GROVE, FLORIDA.

HOOK.

Application filed June 15, 1923. Serial No. 645,676.

*To all whom it may concern:*

Be it known that I, WEST D. ARCHER, a citizen of the United States, residing at Coconut Grove, in the county of Dade and State of Florida, have invented new and useful Improvements in Hooks, of which the following is a specification.

My present invention has reference to a fishing hook.

An object is to produce a hook designed for use in trolling and which has arranged at its eye end a finger for a bait.

A further object is to produce a fishing hook for trolling having its eye end formed with a bait receiving finger and which is passed through the reduced end of a cone-shaped guard, the latter being elliptical in cross section and having one of its reduced sides formed with a fin for holding the hook straight in trolling and for preventing the entanglement of the hook with obstacles.

To the attainment of the foregoing and other objects which will present themselves as the nature of the invention is better understood, reference is to be had to the drawing which accompanies and which forms part of this application.

In the drawing:—

Figure 1:
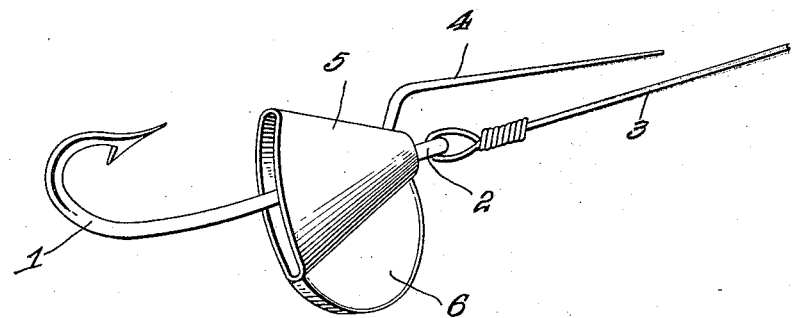
Figure 1 is a perspective view of a hook in accordance with this invention.
Figure 2:
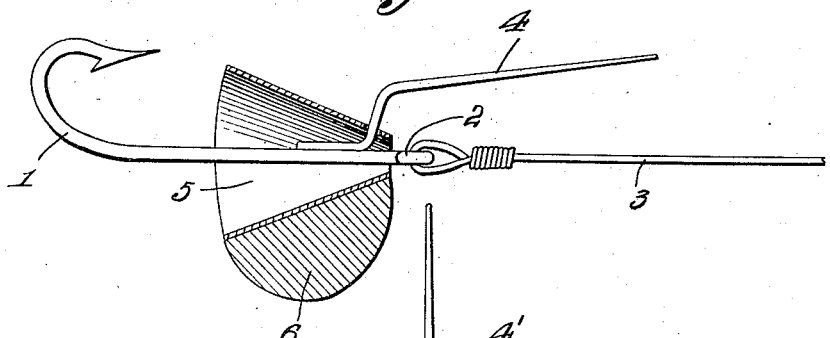
Figure 2 is a side elevation of the hook with the guard in section.
Figure 3:
Figure 3 is a view of the hook having the bait finger integrally formed with the eye portion thereof.

The hook 1 has its shank formed with the usual eye 2 that has secured thereon the wire leader 3. On the shank, at the eye portion of the hook there is an outwardly directed curved finger 4. This finger is designed for the reception of a bait. In Figure 2 of the drawing, the finger is shown soldered or otherwise secured to the shank of the hook, while in Figure 3 the eye end of the shank is extended to form the finger, and for distinction the finger in this figure is indicated by the numeral 4'.

There is arranged on the shank of the hook a conical guard 5. This guard is preferably elliptical in cross section and has both of its ends open. Through the narrow end of the guard the eye is received. The guard, at its said narrow end has one of its narrow sides provided with an opening through which the bait receiving finger passes. The opposite side of the guard is formed with a fin 6. The guard and fin cause the hook to troll straight, the guard likewise preventing the hook from contacting with obstacles should such be met in the trolling.

The invention is, of course, capable of considerable structure variation without departing from the spirit of the invention, and it is thought that the foregoing description will render the advantages of the improvement obvious to those skilled in the art to which the same relates.

Having described the invention, I claim:—

1. A trolling hook having its shank provided with a bait receiving finger, and a conical guard through which the finger passes.

2. A trolling hook having its shank, adjacent to its eye formed with an outwardly rounded bait receiving finger, a cone-shaped guard which is elliptical in cross section and which has both ends open received on the shank of the hook and receiving the finger therethrough.

3. A trolling hook having its shank, adjacent to its eye formed with an outwardly rounded bait receiving finger, a cone-shaped guard which is elliptical in cross section and which has both ends open received on the shank of the hook and receiving the finger therethrough, and a longitudinally extending fin on one of the narrow sides of the guard.

WEST D. ARCHER.